United States Patent [19]
Downey

[11] 3,748,988
[45] July 31, 1973

[54] APPARATUS FOR HOLDING AND EJECTING A PHOTOGRAPHIC CASSETTE

[75] Inventor: Rogers B. Downey, Lexington, Mass.

[73] Assignee: Polaroid Corporation, Cambridge, Mass.

[22] Filed: Dec. 30, 1970

[21] Appl. No.: 102,936

Related U.S. Application Data

[62] Division of Ser. No. 838,794, July 3, 1969, Pat. No. 3,593,643.

[52] U.S. Cl. .................................. 242/198, 352/74
[51] Int. Cl. .............................................. G03b 1/04
[58] Field of Search ................ 95/31 CA; 242/71.2, 242/197, 198; 352/72, 74, 78 R

[56] References Cited
UNITED STATES PATENTS

| | | | |
|---|---|---|---|
| 2,282,051 | 5/1942 | Helbing et al. ................ | 352/74 X |
| 2,449,626 | 9/1948 | Suthann ............................ | 352/74 |
| 2,418,331 | 4/1947 | Briskin et al. .................... | 352/74 |

Primary Examiner—Fred L. Braun
Attorney—Brown & Mikulka

[57] ABSTRACT

Apparatus for receiving a cassette containing a pod of processing fluid for photographic material, for rupturing such pod and for expelling such fluid therefrom. Typically, the fluid filled pod is mounted within the cassette adjacent a support surface and initially protected by a removable cover plate. After removing the aforementioned cover plate to expose the pod, the cassette is inserted into the apparatus between a pair of resiliently compressible rollers mounted for rotation about parallel axes. One of these rollers exerts a force progressively across the pod during the insertion process whereby the pod is ruptured and the fluid expelled therefrom. The rollers are compressed by the cassette as the cassette passes therebetween and expand over an end of the cassette when the cassette has been fully inserted into the apparatus to exert a force against the cassette tending to lock it in position. Alternate embodiments of force applying devices are described for ejecting the cassette from the apparatus against the locking force of the rollers.

10 Claims, 6 Drawing Figures

PATENTED JUL 31 1973 3,748,988

APPARATUS FOR HOLDING AND EJECTING A PHOTOGRAPHIC CASSETTE

This is a division of copending application Ser. No. 838,794, filed July 3, 1969, now issued as U.S. Pat. No. 3,593,643.

BACKGROUND OF THE INVENTION

1. Field of Invention

This invention relates to photography and, more particularly, to an improved system for releasably receiving a photographic cassette and for rupturing a pod mounted therein containing processing fluid for photographic material.

2. Description of the Prior Art

After motion picture film has been exposed in a camera, it has generally been the practice for the photographer to send the container of exposed film to a processing laboratory. At the laboratory the film is removed from the container and subjected to a series of operations in order to produce visible images from the images recorded thereon during the exposure operations. The fully developed film strip is then rewound onto a reel at the laboratory and returned to the user.

The extended delay normally incurred between the time exposed film is sent to the laboratory and returned ready for viewing has proved to be a significant inconvenience to the user and a source of great annoyance.

The field of still photography is no longer hampered by extensive periods of delay associated with the rocessing of exposed film. The impact on the public of the one-step photographic process employing diffusion transfer techniques is a matter of record and generally well known. The home still photographer can now enjoy the fruits of his efforst in a matter of seconds. This important convenience has been available to the amateur still photographer for many years.

Most recently, important technological advances have made it possible for the home photographer interested in motion pictures to enjoy this same convenience. Radically different systems have now been developed which permit the photographer himself to quickly and easily process and project a strip of motion picture film shortly after the pictures have been taken. Exemplary of such new and unique systems are those described in U.S. Pat. Nos. 3,615,127; 3,597,062; 3,537,748; 3,623,417; 3,644,024; 3,600,071; 3,608,455; 3,641,896; 3,627,407; 3,687,051; 3,641,909; 3,595,157; and in copending application Ser. No. 767,609 of Herbert A. Bing, filed Oct. 15, 1968, now abandoned in favor of continuation application Ser. No. 118,963, filed Sept. 25, 1971.

All of these patents and the copending application are assigned to the assignee of the present invention. Each of the systems described in the aforementioned patents and the copending application most advantageously employ a cassette from which the film need not be removed during exposure, processing and projection operations.

In commercial and industrial operations, such rapid motion picture processing systems are not only an improvement as a matter of convenience, but have other important effects as well. For instance, motion picture newsreel programs can be presented on television to the viewing public shortly after events of interest have occurred and been photographed.

In some of these new systems the processing fluid is initially stored in a dispensing container having an applicator, in some the processing fluid is initially stored in a fragible container from which it is later released into a reservoir of the cassette to facilitate the processing operation, while in still others the processing fluid is initially stored in a rupturable pod from which it can be expelled into an applicator at the proper time. Considerable funds and effort are currently being expended to further improve and refine various features of these systems in order to reduce their cost, to further simplify the task of the operator, to improve their reliability, and to improve the quality of the final product. The present invention is directed to an improved system for receiving a cassette of the type in which the processing fluid is intially contained in a pod, for rupturing that pod, for expelling the processing fluid from that pod and for subsequently ejecting the cassette. In its preferred embodiment, the system of this invention is adapted to facilitate the combined functions of processing and projecting the strip of motion picture film housed in the cassette, the overall system being adapted for operation by the photographer himself.

One of the objects of this invention, therefore, is to provide an improved system for rupturing a fluid containing pod.

Another primary object of this invention is to provide an improved system for receiving a motion picture film handling cassette containing a rupturable pod of processing fluid and for automatically rupturing that pod and expelling the fluid therefrom in the process of receiving such cassette.

An additional object of this invention is to provide an improved system for receiving a film handling cassette, for locking that cassette into position within the receiving means and for selectively ejecting the cassette from the receiving means.

A further object of this invention is to provide a system for receiving a film handling cassette containing a rupturable pod of processing fluid and in which a force applying member serves the dual function of expelling the fluid from the pod during the insertion process and of locking the cassette in position when the cassette has been fully inserted into the receiving means.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein like numbers have been employed in the different figures to denote the same parts and wherein:

SUMMARY OF THE INVENTION

Figure 1:
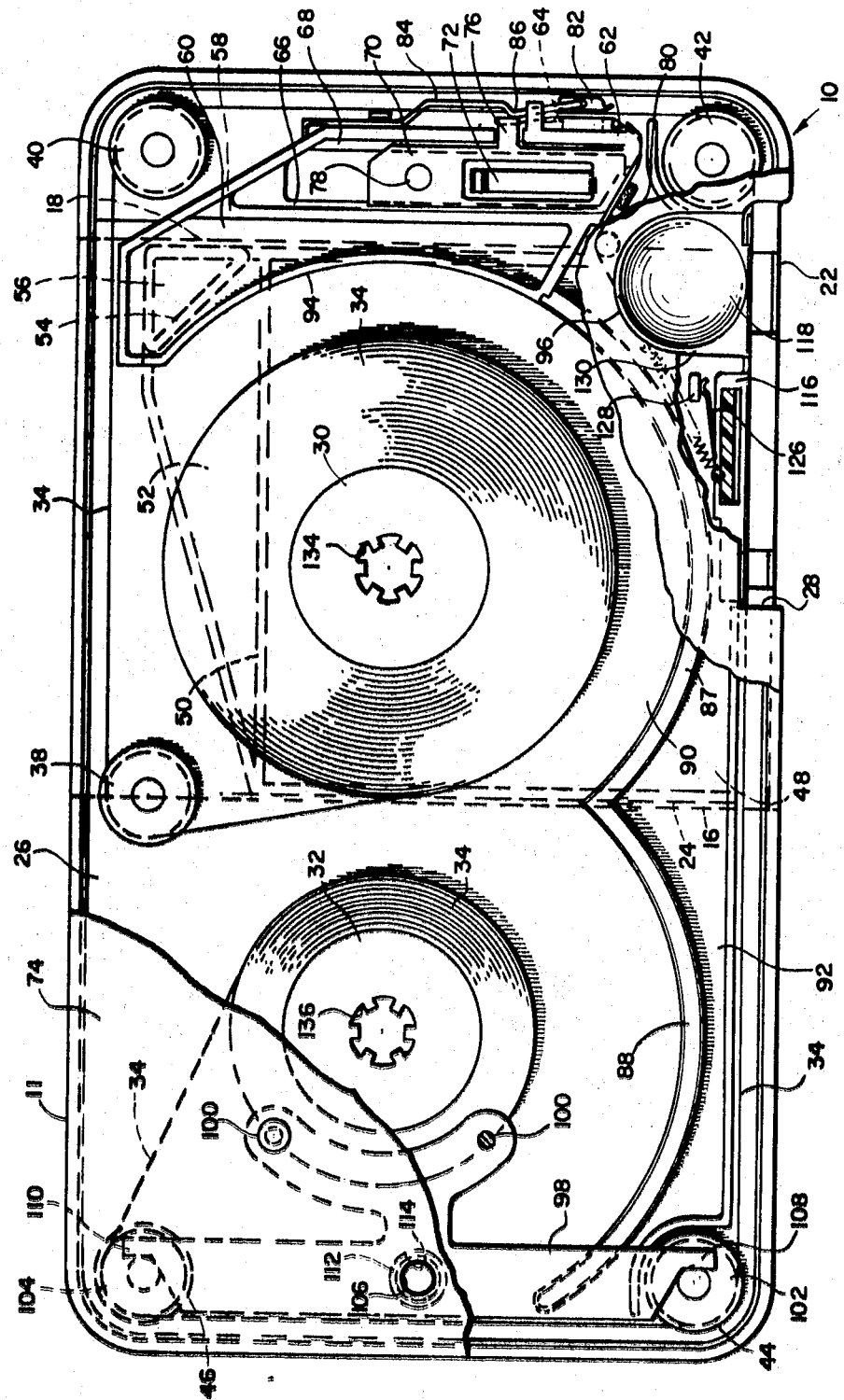
FIG. 1 is a diagrammatic cutaway plan view of a compact multi-purpose motion picture film handling cassette of a type with which the present invention is adapted to be employed.

In its illustrated preferred embodiments, the apparatus of this invention is adapted to operate with compact multi-purpose film handling cassettes to facilitate the processing of the photographic material contained therein and the subsequent projection of the visible images produced during the processing operation. Each such cassette includes a rupturable processing fluid containing pod adapted to have an externally mounted force applying member pressed thereagainst. Such cassette also houses an applicator in communication with the rupturable pod so that fluid expelled from the pod is fed thereto. Means within the cassette are adapted to be driven by externally mounted drive means to progressively advance the film strip within the cassette across the applicator whereby a coating of processing fluid is applied along the length of the film strip.

The processing unit, which as indicated may also serve as a projection unit, includes a receiving chamber into which the cassette may be inserted. A pair of resiliently compressible rollers are mounted on fixed parallel axes of rotation adjacent the entrance to the receiving chamber. As the cassette is introduced into that chamber, it is pressed between these two rollers so as to effect a compression of the materials from which they are formed. These rollers are further positioned so that during the insertion process one of them contacts the rupturable pod and exerts a force progressively across its entire length, while the other acts to support the cassette against the force exerted thereon by the pod rupturing roller. Thus, in the course of the insertion process, these rollers effect a rupturing of the cassette's pod and cause the fluid contained therein to be expelled therefrom. The receiving chamber further includes a support surface against which the cassette is seated when fully inserted thereinto. The rollers are positioned a sufficient distance above that support surface so as to expand over the end of the cassette furtherest removed therefrom when the cassette is seated against that surface. Thus, they exert a force against the cassette firmly pressing the cassette against that surface. The processor also includes a pair of drive shafts adapted to engage the film advancing means of the cassette once the cassette has been inserted thereinto.

A force applying member is mounted within the processing unit so as to selectively exert a force against the cassette to effect an ejection of the cassette from the processing unit against the force exerted thereon by the compressible rollers. Two preferred embodiments of the ejection means are described. One comprises a pivotably mounted lever arm while the other comprises a motor driven rack and pinion mechanism.

DESCRIPTION OF A PREFERRED EMBODIMENT

A preferred embodiment of this invention is illustrated as facilitating the application of a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparision with silver developd in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environement, the resulting negative and positive images in superposition provide a composite that presents a good image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black-and-white image which can be viewed by transmitted light without the necesstiy of removing the processed negative image-containing photosensitive layer is shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. Pats. of Edin H. Land Nos. 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image receiving stratum associated therewith. While an illustrated preferred embodiment of this invention is shown effecting the application of a compatible processing fluid to a film structure not requiring the removal of the photosensitive layer after visible image formation is completed, the invention itself is also applicable for use with other types of processing fluids and film structures.

Figure 2:
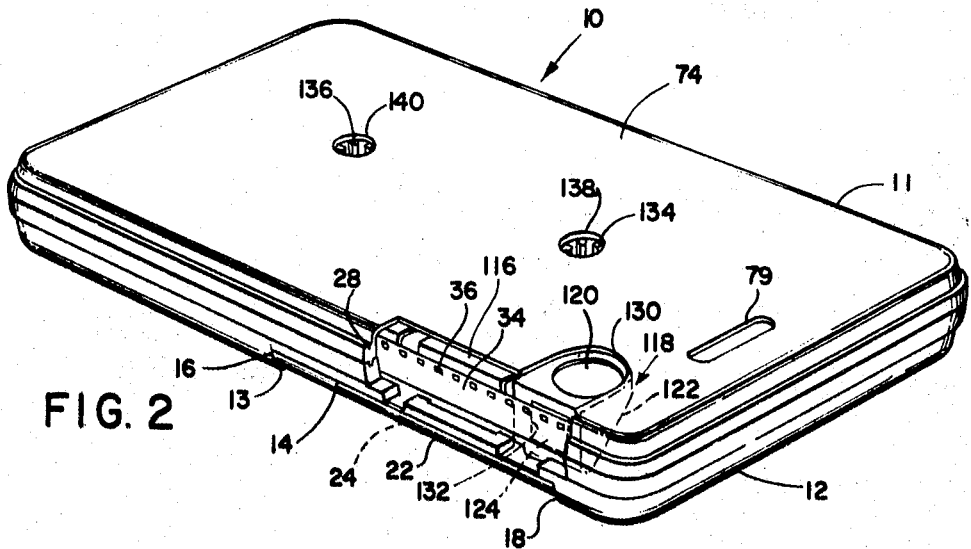
FIG. 2 is a diagrammatic perspective view of the cassette illustrated in FIG. 1.

The illustrated preferred embodiments of this invention may best be understood by first referring to FIGS. 1 and 2 of the drawings, which illustrate a cassette typical of the type with which the present invention is intended to operate. As shown therein, a compact multipurpose film handling cassette 10 is basically constituted by a pair of housing members 11 and 12 connected together to form an enclosed opaque housing. The housing member 12 is provided with a recessed portion 13 consisting of a support surface 14 disposed between a pair of opposed walls 16 and 18. Formed in respective opposed walls 16 and 18 are elongated parallel grooves 20 (see FIG. 4) which are adapted to slidably receive a removable cover plate 22. Thus, the support surface 14, the opposed walls 16 and 18 and the removable cover plate 22 in combination define an enclosed section 24 separated from a main section 26 of the cassette 10.

Cut-out portions of the housing members 11 and 12 define an opening 28 through which image carrying light rays may enter and/or leave the cassette 10 and, further, through which an aperture plate of a camera or of a projector may be introduced into the cassette. In this embodiment, the cassette 10 is relatively flat and generally rectangular parallelepiped in configuration. A supply spool 30 and a takeup spool 32 are coplanarly mounted within section 26 of the cassette 10 for rotation about parallel axes. A strip of unexposed photographic material 34, of the type previously discussed and provided with perforations 36 and leaders affixed to the supply spool 30 and to the takeup spool 32, is initially substantially entirely coiled around the supply spool. Passing from the supply spool 30 to the takeup spool 32, the strip of photographic material 34 sequentially travels around idlers 38, 40, 42, 44 and 46. Advantageously, the ilders 42 and 44 are positioned in opposite corners or extremities of the cassette 10 on the same side of the supply spool 30 and the takeup spool 32. Additionally, the idler 40 is advantageously positioned in the corner of the cassette 10 disposed on the other side of the supply spool 30 from the takeup spool 32 and on the opposite side of those spools from the idlers 42 and 44.

A rupturable pod 48 is positioned in the section 24 of the cassette 10 adjacent the support surface 14. The nature of this pod and the means by which it is ruptured will be described in considerable detail hereinafter. However, at this point it should be noted that this pod 48 includes a weakened seal 50 connected to a fluid feeding device 52 provided with an exit orifice 54. This orifice 54 in turn communicates through an opening 56 in the housing member 12 with a fluid reservoir chamber 58 of a dispensing container 60. Extending from the dispensing container 60 is a rectangular projection 62 which defines an orifice through which processing fluid within the reservoir chamber 58 may be expressed from the dispensing container. One edge of the end of the projection 62 is formed with a taper 64, the purpose of which will subsequently become obvious.

Guide tracks 66 and 68 are formed in an outside face of the dispensing container 60 for purposes of slidably receiving an actuator 70. This actuator 70 is formed with a leaf spring 72, which engages the inside face of the wall 74 of the cassette 10 to firmly seat the actuator in the guide tracks 66 and 68, and further, with a tang 76 extending over and across the side of the dispensing container 60 from which the projection 62 extends. A circular aperture 78 in the actuator 70 is positioned in alignment with an elongated slot 79 passing through the cassette's wall 74 in order that an externally mounted force applying member may be received thereinto for purposes of effecting an upward displacement of the actuator along the guide tracks 66 and 68 from its position as shown in FIG. 1 of the drawings. One end of a strip of flexible material 80 is spring mounted to the structure of the cassette 10 while its other end is connected to the tang 76. This strip of flexible material 80 is disposed over the end of the rectangular projection 62 and includes an opening positioned to be out of alignment with the orifice of that projection when disposed in the position illustrated in FIG. 1 and so as to be in alignment with that orifice when the actuator 70 is displaced it its upwardmost position along the guide tracks 66 and 68.

Additionally, a support member 82 is pivotably connected between the ends of a uniquely configured U-shaped spring 84 mounted on the dispensing container 60. It will be noted that this U-shaped spring 84 includes an offset 86 adapted to be engaged by the tang 76 when in its position as shown in FIG. 1.

Intermediate the idlers 40 and 42, the strip of photographic material 34 is disposed between and in spaced apart relationship to the strip of flexible material 80 and the support member 82. However, it will be appreciated that when the actuator 70 is displaced upwardly, the tang 76 is removed from contact with the offset 86 in the spring 84 thereby permitting the support member 82 to slidably engage the strip of photographic material 34 against that section of the strip of flexible material 80 disposed across the projection 62. Thus, when the actuator 70 is in its position as shown in FIG. 1, the dispensing container 60 is sealed by the strip of flexible material 80 and the strip of photographic material 34 may be transported between and out of contact with that strip of flexible material and the support member 82. Also, whenever the actuator 70 is moved upwardly along the guide tracks 66 and 68, the strip of flexible material 80 is displaced into an unsealing relationship with the dispensing container 60 and the support member 82 slidably engages the strip of photographic material 34 against the strip of flexible material.

The rupturable pod 48 initially contains a quantity of processing fluid suitable to form visible images from the images recorded on the strip of photographic material 34 during exposure operations. Typically, the walls of the rupturable pod 48 consist of an outer layer of pouch or glassine paper, an intermediate layer of lead foil and an inner layer of polyvinylchloride material. The polyvinylchloride layers are bonded together adjacent their edge portions to effect the sealing of the fluid filled cavity with the seal 50 being substantially weaker than the seals around the other edges of the pod 48. Typically, the walls of the fluid feeding device 52 are formed of an outer layer of pouch or glassine paper bonded to an inner layer of polyethylene material. Again the polyethylene material layers may be bonded together where appropriate and also bonded to the outer layer of the walls of the pod 48 to connect the fluid feeding device to the pod. Preferably, the outside surface of the assembly comprising the pod 48 and the fluid feeding device 52 adjacent the support surface 14 is adhered thereto by any suitable means to facilitate fixedly positioning that assembly within the cassette's enclosed section 24.

It should be noted that the capacity of the reservoir chamber 58 of the dispensing container 60 should be equivalent to or greater than that of the rupturable pod 48. For instance, approximately 2 cc. of processing fluid is sufficient to treat 50 feet of Super-8 format film. Under such conditions, the pod 48 will have a capacity of 2 cc. and the capacity of the dispensing container's reservoir chamber 58 will be on the order of 2 to 2½ cc. It will be appreciated that the application of a compressive force progressively along the length of the pod 48 toward its weakened seal 50 and across the fluid feeding device 52 will first effect a rupturing of the pod along the seal 50 and then cause the processing fluid initially stored therein to be expelled therefrom into the dispensing container's reservoir chamber 58.

Mounted between the housing member 12 and the wall 74 of the housing member 11 is a light sealing arcuate member 87, one end of which is positioned against the dispensing container 60. The other end of the member 87 is connected to one end of a second light sealing arcuate member 88 which extends to within the vicinity of the idler 44. These arcuate members 87 and 88, in combination with the dispensing container 60, serve to effectively divide the section 26 of the cassette 10 into a first compartment 90 sealed in a light tight manner from a second compartment 92. Additionally, it will be noted that in the illustrated embodiment of the cassette, the supply spool 30, the light sealing arcuate member 87 and a wall 94 of the dispensing container 60 share a common axis. Thus, the arcuate member 87 and the wall 94 further serve to control the disposition of that portion of the strip of photographic material 34 coiled around the supply spool 30 within the cassette 10. Similarly, the takeup spool 32 and the light sealing arcuate member 88 share a common axis and, consequently, the arcuate member 88 serves to control the disposition of the portion of the strip of photographic material 34 coiled around the takeup spool with the cassette 10.

It should also be noted at this point that the wall 74 of the cassette 10 is provided with an opening 96 communicating with the aforementioned opening 28 of the cassette. As will subsequently become more apparent, this opening 96 permits light rays from an external light source to be introduced into the cassette 10 for film projection purposes.

As shown in FIG. 1, a resilient member 98 is connected to the inside face of the wall 74 by any suitable means, such as rivets 100, and extends over and in spaced relationship to the end surfaces 102 and 104 of the idlers 44 and 46, respectively. Provided in the wall 74 is an aperture 106 disposed over the resilient member 98 whereby an external force applying member may be selectively introduced into the cassette 10 to urge the resilient member's end portions 108 and 110 into frictional engagement with the idlers 44 and 46, respectively, to restrain further rotational movement of those idlers. In order to effectively light seal the interior of the cassette 10, a ring 12 mounted on the resilient member 98 is coaxially disposed with respect to the aperture 106 and adapted to seat in an annular recess 114 of the wall 74.

Mounted within compartment 92 of the cassette 10 so as to be in alignment with the opening 28 is a pressure plate assembly 116 in which is mounted a light reflecting element 118. It will be noted that this light reflecting element 118 is disposed in operable relationship to both the opening 28 and the opening 96 of the cassette 10. In the illustrated embodiment of the cassette, the light reflecting element 118 is prismatic in nature and includes a concave light receiving transparent face 120 and a flat reflecting surface 122 which reflects light received into the element through the light receiving face 120 outwardly thereof through a convex transparent face 124.

The pressure plate assembly 116 includes a leaf spring 126 which seats against a boss 128 formed integrally with the housing member 12 to continually urge the pressure plate assembly toward the cassette's opening 28. The pressure plate assembly 116 is mounted within the cassette 10 so that it may be displaced inwardly of the cassette from the opening 28 against the force of the spring 126 when the aperture plate of a camera or a projector is positioned in operative relationship therewith. Forming part of the pressure plate assembly 116 is a mounting bracket 130 which serves to fixedly position the light reflecting element 118 with respect to the pressure plate assembly and, more particularly, with respect to an aperture 132 of that assembly.

The spools 30 and 32 are respectively provided with fluted recesses 134 and 136 which are adapted to receive externally mounted drive means through apertures 138 and 140 appropriately provided through the cassette's wall 74. Thus, the cassette 10 includes means for reversably transporting the strip of photographic material 34 between the supply spool 30 and the takeup spool 32 across the dispensing container's projection 62 and the pressure plate assembly 116. The cassette's opening 28 constitutes a film gate adapted to serve as an exposure station during a first pass of the photosensitive film strip 34 across the pressure plate assembly 116 and as a projection station during subsequent operations in which the film strip, in a fully processed condition, is advanced from the supply spool 30 to the takeup spool 32.

Idler 42, around which the film strip 34 passes on its way from the supply spool 30 to the pressure plate assembly 116, may, if desired, be mounted on a movable post spring biased toward the corner which it occupies in the housing of the cassette 10 and capable of being moved resiliently inward away from that corner. Also, idler 44 may be spring biased toward the corner which it occupies in the housing in the cassette 10 and capable of being moved resiliently inward away from that corner. This represents one way to minimize strain exerted on the film strip 34 by the conventional intermittent film advancement structure during these exposure and projection operations. It will be appreciated that the housing members 11 and 12, as well as elements associated therewith, e.g., the light sealing members 87 and 88, and the boss 128 may, for example, be formed from a suitable thermoplastic resin such as an acrylic or a polystyrene, in an inexpensive injection molding process. Similarly, the dispensing container 60, the idlers 38, 40, 42, 44 and 46 and the cover plate 22 may be formed by injection molding processes employing the same types of material.

While the various details of the cassette 10 do not constitute part of the present invention, they have been illustrated and briefly described for purposes of imparting a complete understanding of the present invention. Obviously, certain of these features may readily take other forms than that described. Some of the features of the illustrated cassette embodiment, e.g., the rupturable pod-fluid feeding device assembly, the snubbing arrangement, the applicator system, the pressure plate assembly, the light reflecting element and the film gate arrangement, are the subject of certain of the aforementioned patents and copending applications.

As previously indicated, the present invention is directed to an improved apparatus for receiving and selectively ejecting such cassettes, for rupturing the fluid containing pod of such cassettes, for expelling the fluid intially stored therein into the cassette's applicator system and for effecting the coating of the cassette's film strip with such fluid. Preferably, the features of the present invention are incorporated into a unit which not only facilitates the processing of the cassette's film strip but which also subsequently facilitates the projection, for viewing purposes, of the visible images formed on the film strip during the processing operation.

Figure 5:
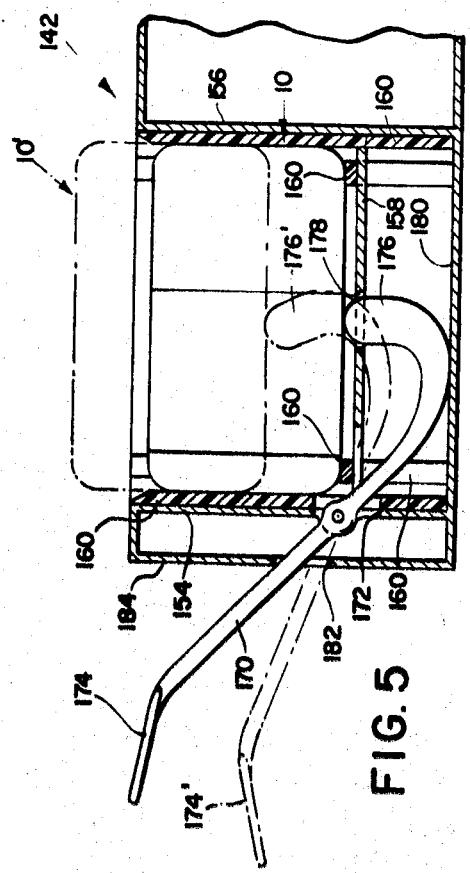
FIG. 5 is a vertical sectional view of the apparatus of this invention taken along line 5—5 of FIG. 4.
Figure 4:
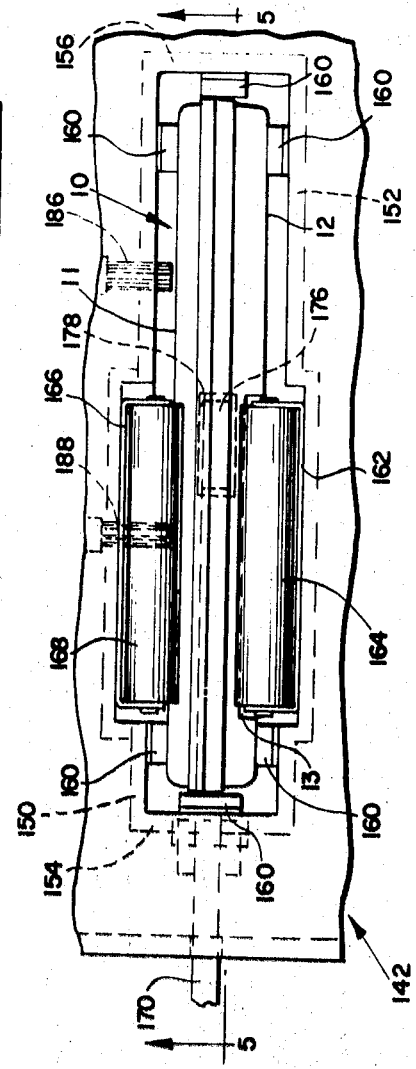
FIG. 4 is a partial plan view of the apparatus of this invention illustrating the cassette shown in FIGS. 1 and 2 inserted into the cassette receiving means of the apparatus.
Figure 3:
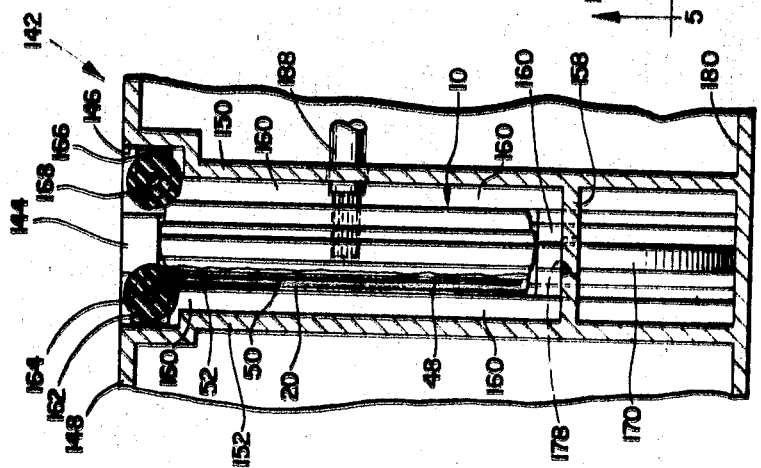
FIG. 3 is a fragmentary diagrammatic vertical sectional view of the apparatus of the present invention illustrating the cassette shown in FIGS. 1 and 2 inserted into the cassette receiving means of that apparatus.

Referring now to FIGS. 3, 4 and 5 of the drawings, a processor-projector unit 142 is illustrated that includes a cassette receiving chamber 144. After the strip of photographic material 34 has been exposed with the cassette 10 mounted in an appropriate camera (not shown) in its travel from the supply spool 30 onto the takeup spool 32 and before inserting the cassette into the processor-projector unit 142, the cassette's cover plate 22 is removed. Insertion of the cassette 10 into the receiving chamber 144 is effected through a slot 146 provided in the top panel 148 of that unit and with the side of the cassette containing the opening 28 first passing through that slot.

The cassette's receiving chamber 144 is formed of interconnected support plates 150, 152, 154, 156 and 158. A plurality of elongated standoffs 160, mounted on the aforementioned support plates and extending from those plates interiorly of the cassette receiving chamber 144, serve to first guide the cassette 10 into that chamber and, once the cassette has been fully inserted thereinto, to support and align the cassette. Typically, the support plates 150, 152, 154, 156 and 158 are formed from a material such as stainless steel while the elongated standoffs 160 are formed from a polymeric material such as polytetrafluoroethylene. When fully inserted into the receiving chamber 144 the cassette 10 is seated against the elongated standoffs 160 mounted from the support plate 158. Preferably, the cassette receiving chamber 144 is oriented within the processor-projector unit 142 so that the cassette 10 is inserted vertically downward thereinto (as viewed in FIGS. 3, 4 and 5) through the slot 146.

Extending inwardly from the support plate 152 is a bracket 162 which rotatably supports a roller 164. Similarly, a bracket 166 extends inwardly of the cassette receiving chamber 144 from the support plate 150 to rotatably support a roller 168. These rollers 164 and 168 are formed of a resiliently compressible material such as a hard rubber and are spaced apart on parallel axes of rotation so that their adjacent peripheral surfaces are initially positioned slightly closer together than the width of the cassette 10. More specifically, their diameters are such, and their axes of rotation are spaced apart so, that the roller 164 firmly presses against the cassette's rupturable pod 48 as the cassette 10 is inserted into the receiving chamber 144, while the roller 168 supports the cassette against the force exerted thereon by the roller 164. In this respect, the roller 164 is positioned to be in alignment with the recessed portion 13 of the cassette's housing member 12 as the cassette is inserted into the receiving chamber 144 and, further, is of a length slightly less than the distance between the opposed walls 16 and 18 of that portion of the cassette. It will be recognized that, during this insertion process, the cassette 10 exerts a force against the rollers 164 and 168 causing them to be somewhat compressed.

These rollers 164 and 168 are also positioned a carefully predetermined distance above the support plate 158 so that when the cassette 10 is seated against the elongated standoffs 160 mounted on that support plate, a portion of those rollers extend above the opposite end of the cassette. In this manner, the rollers 164 and 168 will expand over that end of the cassette 10 to firmly press the cassette against the elongated standoffs 160 on the support plate 158. As the cassette 10 is partially inserted into the receiving chamber 144, the roller 164 initially contacts the end of the rupturable pod 48 furthermost disposed from its weakened portion 50. In the course of completing the insertion process, that roller 164 progressively applies a force against the pod 48 toward its weakened portion 50 and across the fluid feeding device 52. Thus, as the cassette is inserted into the receiving chamber 144, the roller 164 automatically effects a rupturing of the pod 48 and causes the processing fluid initially stored therein to be expelled therefrom into the fluid reservoir chamber 58 of the dispensing container 60. Further, the nature of these rollers 164 and 168 and their arrangement within the processor-projector unit 142 serve to automatically effect a "locking" of the cassette 10 in position when fully inserted into the receiving chamber 144. As depicted in FIG. 3, the pod's weakened seal 50 has been ruptured, the processsing fluid expelled from between the opposed walls of that pod 48 through the fluid feeding device 52 into the dispensing container's reservoir chamber 58 and the cassette 10 is "locked" in position within the receiving chamber 144 of the processor-projector unit 142 by the rollers 164 and 168.

Slidably mounted within the processor-projector unit 142 are a pair of drive shafts 186 and 188. After the cassette 10 has been fully inserted into the receiving chamber 144 of the processor-projector unit 142, these drive shafts 186 and 188 may be selectively displaced (means not shown) into engagement with the fluted recesses 134 and 136, respectively, of the cassette's supply spool 30 and takeup spool 32. These drive shafts 186 and 188 may then be alternately energized by the motor (not shown) of the processor-projector unit 142 to effect selective reversible transport of the strip of photographic material 34 within the cassette 10 between the supply spool 30 and the takeup spool 32. The processor-projector unit 142 also includes a displaceably mounted force applying member (not shown) which may be selectively introduced through the slot 79 in the cassette's wall 74 once the cassette is fully inserted into the receiving chamber 144 to effect selective reversible displacement of the actuator 70 along the guide tracks 66 and 68.

A "laddle-shaped" arm 170 is disposed through a slot 172 appropriately provided in the support plate 154, being pivotably connected to that support plate at a point intermediate its two ends 174 and 176. The arm 170 is configured so that its end 176 is positioned in alignment with a slot 178 in the support plate 158 and normally seated against the base panel 180 of the processor-projector unit 142. The end 174 of this arm 170 extends exteriorly of the processor-projector unit 142 through an opening 182 appropriately provided in its side panel 184. Thus, whenever the cassette 10 is positioned within the receiving chamber 144, an operator may depress the end 174 of the arm 170 downwardly from its position illustrated in FIG. 6 to effect an ejection of the cassette 10 from the receiving chamber against the "locking" force exerted thereon by the rollers 164 and 168. The lowermost position to which the operator may depress the end 174 of the arm 170 is shown in phantom in FIG. 6. Similarly, the position of the other end 176 of that arm 170 and the position of the cassette 10 at such time are also shown in phantom in that figure of the drawings. In this connection, the term "ejecting" has been employed here to cover movement of the cassette 10 from its position wherein it is "locked" within the processor-projector unit 142 and relatively inaccessible to the operator to a position wherein it may be readily manually removed therefrom by the operator. However, it is also possible to design the ejection means so that it actually propels the cassette 10 from the unit 142. Consequently, this term "ejecting" is intended broadly to cover either or both of these situations.

OPERATION OF THE PREFERRED EMBODIMENT

To summarize the operation of the preferred embodiment of this invention, the cassette 10 is initially furnished with substantially all of the film strip 34 in an unexposed condition coiled on the supply spool 30, with the processing fluid retained in the rupturable pod 48 and with the actuator 70 disposed in the position shown in FIG. 1. For exposure purposes, the cassette 10 is mounted in an appropriate camera (not shown) with the drive means of the camera engaging the recess 136 of the takeup spool 32 through a friction clutching arrangement as is conventional. While the particular camera employed does not form part of the present invention, it may advantageously take the form of that described in the aforementioned U.S. Pat. No. 3,600,071. It will be noted that the camera described in that application includes a door mounted pin which automatically enters the cassette 10 through its aperture 106 to snub the idlers 44 and 46 whenever the cassette is mounted therein. The aperture plate of the camera, which may also take a conventional form, operably engages the cassette's pressure plate assembly 116 to position the section of the film strip 34 disposed thereacross in the proper focal plane. Also, a conventional intermittent film advancement mechanism of the camera engages the perforations 36 of the film strip 34 to effect proper step advancement of the film strip along the pressure plate assembly 116. In this manner, the operator can selectively record images on the photosensitive film strip 34 as it traverses the cassette's opening 28 on its way from the supply spool 30 to the takeup spool 32. In the embodiment illustrated, the photosensitive surface of the film strip 34 faces inwardly of the cassette 10 such that exposure of the photosensitive emulsion is effected through the transparent film base. After the film strip 34 has been completely exposed, the cassette 10 can be quickly removed from the camera and replaced, when desired, by an identical cassette containing unexposed film.

When convenient, the film processing operation can be initiated by first removing the cassette's cover plate 22 and inserting the cassette into the receiving chamber 144 of the processor-projector unit 142 intermediate the resiliently compressible rollers 164 and 168. During this insertion process, the fluid containing pod 48 is automatically ruptured and the fluid initially stored therein expelled therefrom through the fluid feeding device 52 into the reservoir chamber 58 of the dispensing container 60. The aforementioned force applying member (not shown) is introduced into the cassette through its elongated slot 79 to effect a displacement of the strip of flexible material 80 from its sealing relationship over the dispensing container's projection 62 into an unsealing relationship therewith and to cause the support plate 82 to slidably engage the film strip 34 against that section of the strip of flexible material disposed over the projection 62. By now turning an appropriate switch located on the control panel (not shown) of the processor-projector unit 142, the exposed strip of material is returned from the takeup spool 32 to the supply spool 30. During this sequence, the exposed photographic film strip 34 passes across the dispensing container's projection 62 and draws processing fluid from the dispensing container 60 to form a uniform fluid coating along its entire length. In this respect, it will be noted that, with the cassette 10 inserted into the unit 142, the projection 62 is disposed at the lowermost point of the dispensing container 60 so that the force of gravity causes the processing fluid to be continually fed through the projection 62 from the reservoir chamber 58. The thickness of the strip of flexible material 80 is determinative of the thickness of the fluid coating applied to the film strip 34 and the taper 64 provides a relatively sharp doctor blade for applying that coating to the film strip.

The motor of the processor-projector unit 142 is automatically de-energized by conventional means (not shown) as soon as the entire length of exposed film strip 34 has been treated with processing gluid. At this time, the force applying member of the processor-projector unit 142 engaging the cassette's actuator 70 should be withdrawn from the cassette to permit the actuator to return to its original position wherein the orifice through the dispensing container's projection 62 is sealed by the strip of flexible material 80 and wherein the film strip 34 is permitted to return to its original position out of contact with both the strip of flexible material and the support plate 82. Additionally, the operator should now effect a snubbing of the cassette's idlers 44 and 46. This may be accomplished by displacing a pin (not shown) mounted in the processor-projector unit 142 adjacent the cassette's aperture 106 into engagement with the cassette's resilient member 98.

The processor-projector unit 142 also includes other conventional means not illustrated in the drawings associated with the projection of the visible images recorded on the fully processed film strip 34. These include an aperture plate and an intermittent film advancement mechanism positioned in operable relationship to the cassette's pressure plate assembly 116 through the cassette's opening 28 and a light source positioned in operable relationship to the cassette's opening 96. Additionally, such other conventional means include a shutter mechanism and a lens system. By now turning another switch (not shown) located on the control panel of the processor-projector unit 142, that unit's light source and motor are simultaneously energized, in this instance the motor driving both the aforementioned intermittent film advancement mechanism of the unit 142 and the cassette's takeup spool 32 through the drive shaft 188. As the now fully processed film strip 34 is once again drawn across the cassette's opening 28 onto the takeup spool 32, visible images contained thereon are projected for viewing purposes. In this connection, the processor-projector unit's aperture plate acting against the cassette's pressure plate assembly 116 accurately positions the section of the film strip 24 disposed therebetween at the proper film plane for projection purposes. Simultaneously, light rays from the light source of the processor-projector unit 142 enter the cassette 10 through its opening 96 and are redirected by the light reflecting element 118, through the aperture 132 in the pressure plate assembly 116 and the sections of the film strip 34 intermittently positioned thereover, outwardly of the cassette through its opening 28. Again, conventional means (not shown) automatically de-energize the light source and motor of the pressor-projector unit 142 once the visible images on the entire processed film strip 34 have been projected.

During these operations the cassette 10 is "locked" in the receiving chamber 144 of the processor-projector unit 142 by the force exerted thereagainst by the rollers 164 and 168, which force firmly seats the cassette against the elongated standoffs 160 mounted to the support plate 158.

Preferably, the film strip 34 is returned from the takeup spool 32 to the supply spool 30 before removing the cassette 10 from the processor-projector unit 142. Removal of the cassette 10 from that unit 142 is effected by the operator's displacing the end 174 of the arm 170 from its original position as shown in FIG. 5 of the drawings to its position shown therein in phantom. The cassette 10 is stored in this condition until it is again desired to view the processed film strip 34 retained therein.

DESCRIPTION OF AN ALTERNATE EMBODIMENT

Figure 6:
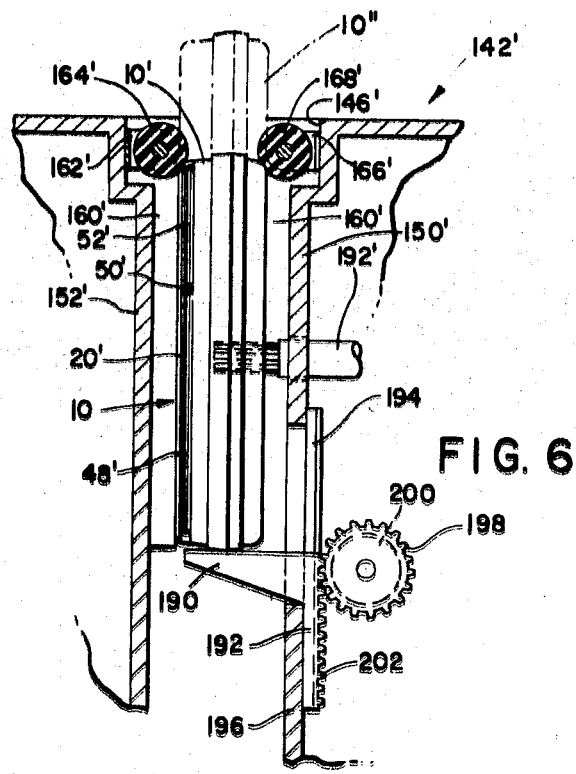
FIG. 6 is a view similar to that of FIG. 3 illustrating an alternate embodiment of the means employed in the apparatus of this invention for selectively ejecting the cassette.

An alternate embodiment of the means for ejecting the cassette 10 from the processor-projector unit 142 is illustrated in FIG. 6 of the drawings. The same numerals primed are employed in that figure to denote the parts of that embodiment which remain substantially unchanged from the embodiment illustrated in the other figures of the drawings.

In this embodiment, when the cassette 10' is fully inserted into the receiving chamber 144' of the processor-projector unit 142', the rollers 164' and 168' firmly seat the cassette against a flanged projection 190 extending from a displaceably mounted member 192. In this respect, the member 192 is slidably disposed between a pair of channels 194 mounted on a portion 196 of the support plate 150'. A pinion 198 connected to a motor 200 extends through an opening in the support plate 150' to engage a rack 202 formed on a face of the displaceably mounted member 192. Operation of the motor 200 is controlled by a switch mounted on the control panel (not shown) of the processor-projector unit 142'. It will be appreciated that the motor may be selectively energized to effect reversable displacement of the member 192 between its initial position shown in FIG. 6 to its position shown in phantom in that figure of the drawings. Thus, with that member 192 in its initial position and the cassette 10' fully inserted into the receiving chamber 144' of the processor-projector unit 142', the motor 200 may be energized to effect an ejection of the cassette 10' from the processor-projector unit against the force exerted thereon by the resiliently compressible rollers 164' and 168'.

Those familiar with the motion picture arts will readily appreciate the novel and highly unique advantages of this invention. Most importantly, efficient and extremely simple means are provided for receiving a film handling cassette containing a rupturable pod of processing fluid, for locking such cassette in position when fully inserted into such receiving means, for rupturing such pod and expelling such fluid therefrom and for subsequently effecting the ejection of such cassette from such receiving means.

The term "projector" is used herein in a comprehensive sense, i.e., to broadly refer to those systems wherein the visible images recorded on a sheet of material are re-imaged for viewing purposes and is not restricted to only those systems in which the recorded visible images are projected onto a screen of one type or another.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

I claim:

1. Photographic apparatus useful in operations involving a film handling cassette including a strip of photographic material and means adapted to be driven by external drive means for advancing such strip of photographic material within such cassette, comprising:
   first means for receiving such cassette;
   second means for locking such cassette in position when fully inserted into said first means, said second means including at least one rotatably mounted resiliently compressible roller positioned to be engaged and compressed by such cassette in the process of inserting such cassette into said first means and further positioned so that it subsequently expands over a portion of such cassette when such cassette is fully inserted into said first means to exert a force against such cassette tending to lock such cassette in such position;
   third means for selectively driving such advancing means of such cassette; and
   fourth means for selectively ejecting such cassette from said apparatus against said force exerted thereon by said resiliently compressible roller.

2. The apparatus of claim 1 wherein said fourth means includes a pivotably mounted lever arm, one end of said arm adapted to be selectively displaced from a first to a second position and the other end thereof adapted to contact such cassette and eject such cassette from said apparatus as said one end is displaced from its said first position into its said second position.

3. The apparatus of claim 1 wherein said fourth means includes a substantially rigid member adapted to be displaced from a first position, wherein it does not tend to eject such cassette from said apparatus, into a second position, said member exerting a force on such cassette during said displacement thereof effecting an ejection of such cassette from said apparatus, a rack on said rigid member, a pinion engaging said rack and a motor connected to said pinion, whereby said pinion may be selectively driven by said motor to effect said displacement of said rigid member.

4. Photographic apparatus useful in operations involving a film handling cassette including a strip of photographic material and means adapted to be driven by external drive means for advancing such strip of photographic material within such cassette, comprising:
first means for receiving such cassette;
second means for locking such cassette in position when fully inserted into said first means, said second means including a pair of spaced apart resiliently compressible members positioned to be disposed on opposite sides of such cassette when such cassette is inserted into said first means to be engaged and compressed by such cassette in the process of inserting such cassette into said first means and further positioned so that they subsequently expand when such cassette is fully inserted into said first means to exert a force against such cassette tending to lock such cassette in such position;
third means for selectively driving such advancing means of such cassette; and
fourth means for selectively ejecting such cassette from said apparatus against said force exerted thereon by said resiliently compressible member.

5. The apparatus of claim 4 wherein at least one of said resiliently compressible members comprises a roller.

6. The apparatus of claim 5 wherein said first means includes a support against which such cassette seats when fully inserted thereinto and said roller is positioned to press against progressive sections of such cassette as such cassette is inserted into said receiving means whereby at least the peripheral edge portion of said roller is compressed and extends a sufficient distance beyond an end of such cassette spaced from the portion thereof seated against such support when such cassette is fully inserted into said apparatus so that said edge portion expands in a direction toward such cassette over such cassette to firmly urge such cassette against said support.

7. The apparatus of claim 4 wherein said resiliently compressible members comprise a pair of rollers.

8. The apparatus of claim 7 wherein said receiving means includes a support against which such cassette seats when fully inserted into said first means and said rollers are positioned so that both of their edge portions are compressed by such cassette as such cassette is inserted into said receiving means and extends a sufficient distance beyond an end of such cassette spaced from the portion thereof seated against such support when such cassette is fully inserted into said apparatus so that said edge portions expand in a direction toward such cassette over such cassette to firmly urge such cassette against said support.

9. The apparatus of claim 8 wherein said first means comprises a slot through which such cassette is inserted into said apparatus and said rollers are disposed adjacent opposite sides of said slot in the immediate vicinity of said slot.

10. Photographic apparatus useful in operations involving a film handling cassette including a strip of photographic material and means adapted to be driven by external drive means for advancing such strip of photographic material within such cassette, comprising:
a housing having a slot therein through which such cassette may be inserted into said apparatus;
first means for receiving such cassette, said first means including a support spaced a predetermined distance inwardly of said housing from said slot and against which such cassette seats when fully inserted into said first means;
second means for locking such cassette in position when fully inserted into said first means, said second means including at least one resiliently compressible member positioned to be engaged and compressed by such cassette in the process of inserting such cassette into said first means and further positioned so that it subsequently expands over a portion of such cassette when said cassette is fully inserted into said first means to exert a force against such cassette urging such cassette against said support to lock such cassette in said apparatus;
third means for selectively driving such advancing means of such cassette; and
fourth means for selectively ejecting such cassette from said apparatus against said force exerted thereon by said resiliently compressible member.

* * * * *